Jan. 4, 1927.
S. M. FAIRCHILD
AERIAL CAMERA
Filed March 1, 1923    11 Sheets-Sheet 1
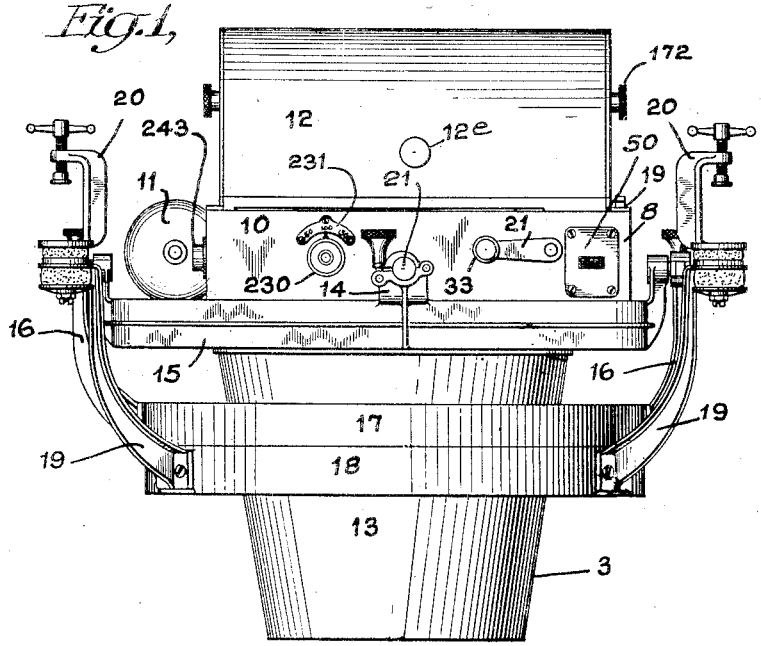
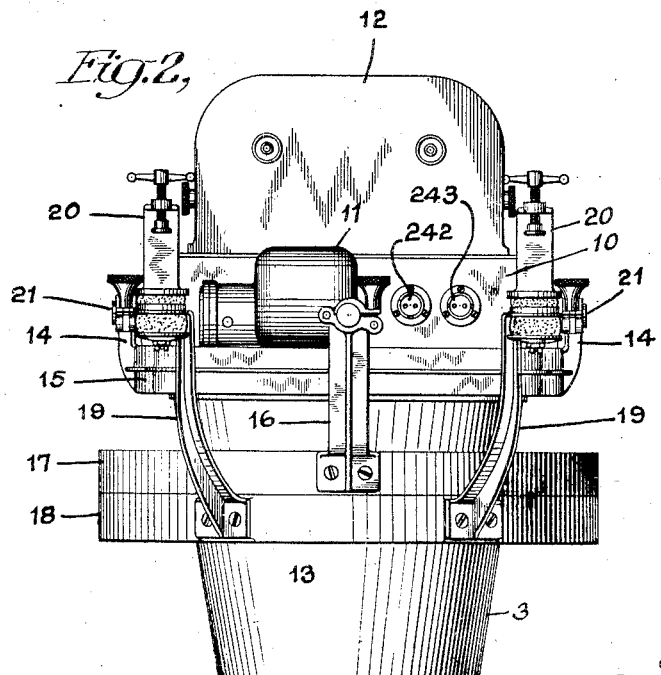
Inventor
S. M. Fairchild
By his Attorneys
Cooper, Kerr & Dunham Jan. 4, 1927.
S. M. FAIRCHILD
1,612,860
AERIAL CAMERA
Filed March 1, 1923  11 Sheets-Sheet 2
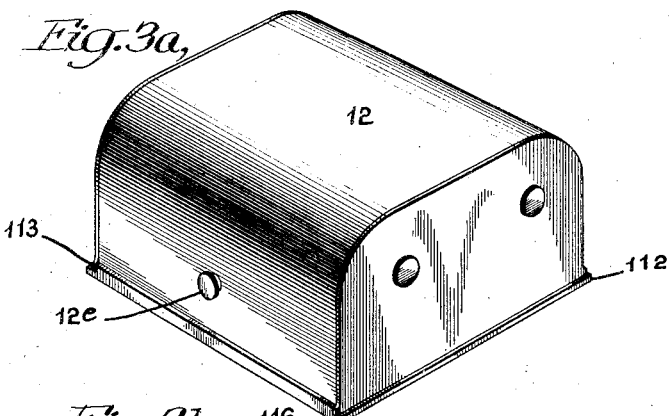
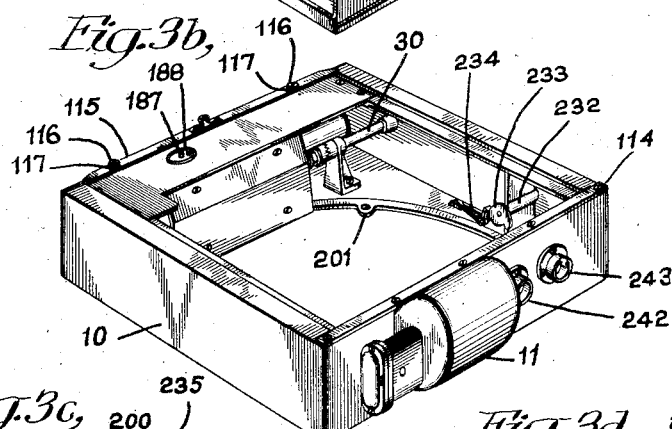
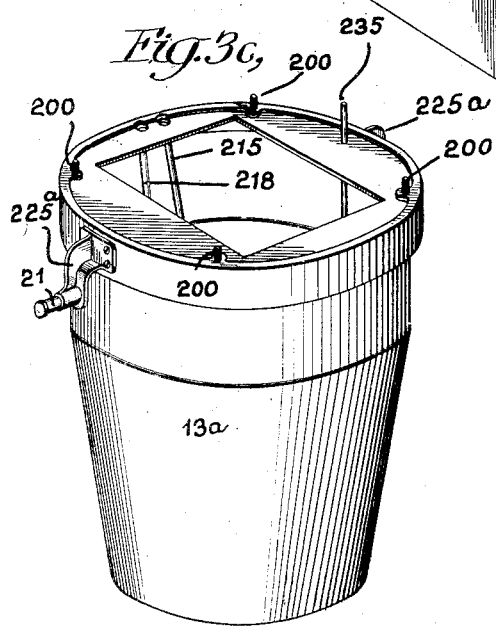
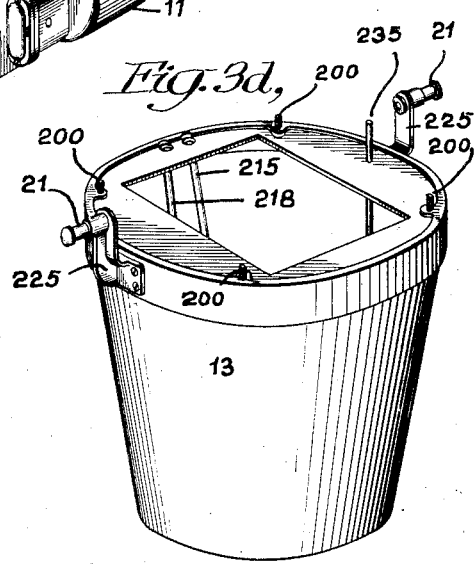
Inventor
S. M. Fairchild
By his Attorneys
Cooper, Kerr & Dunham

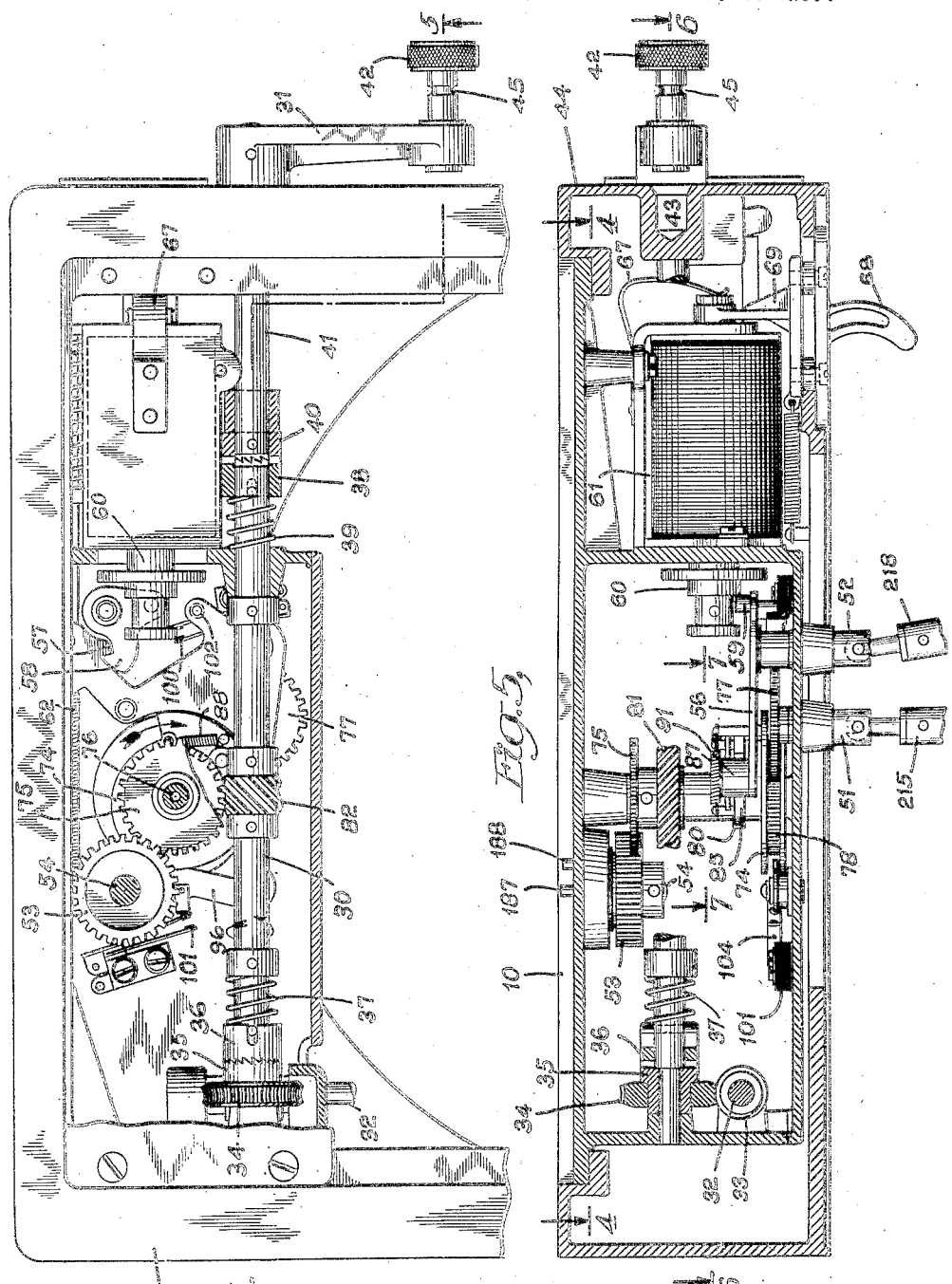

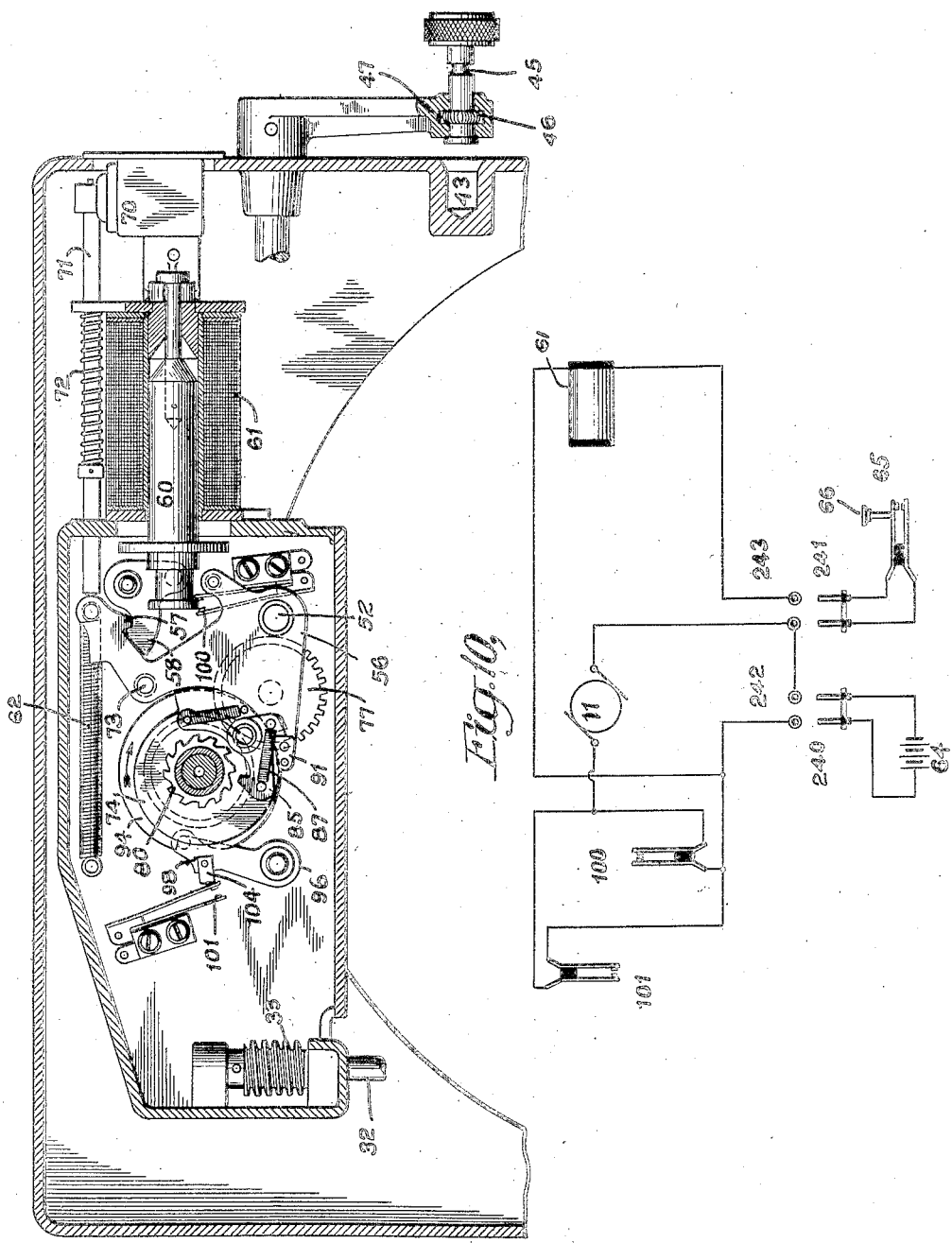

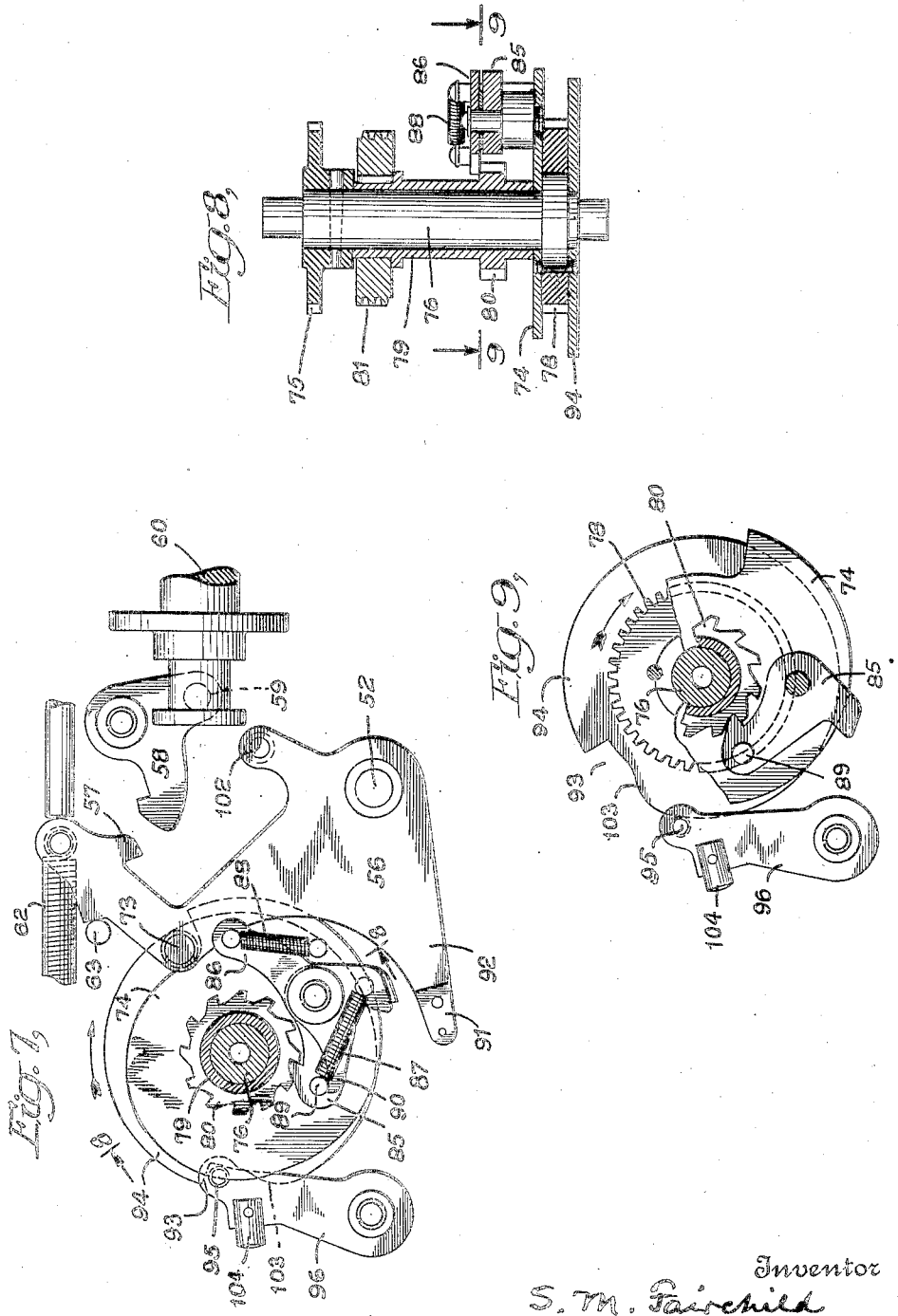

Jan. 4, 1927. 1,612,860
S. M. FAIRCHILD
AERIAL CAMERA
Filed March 1, 1923 11 Sheets-Sheet 6
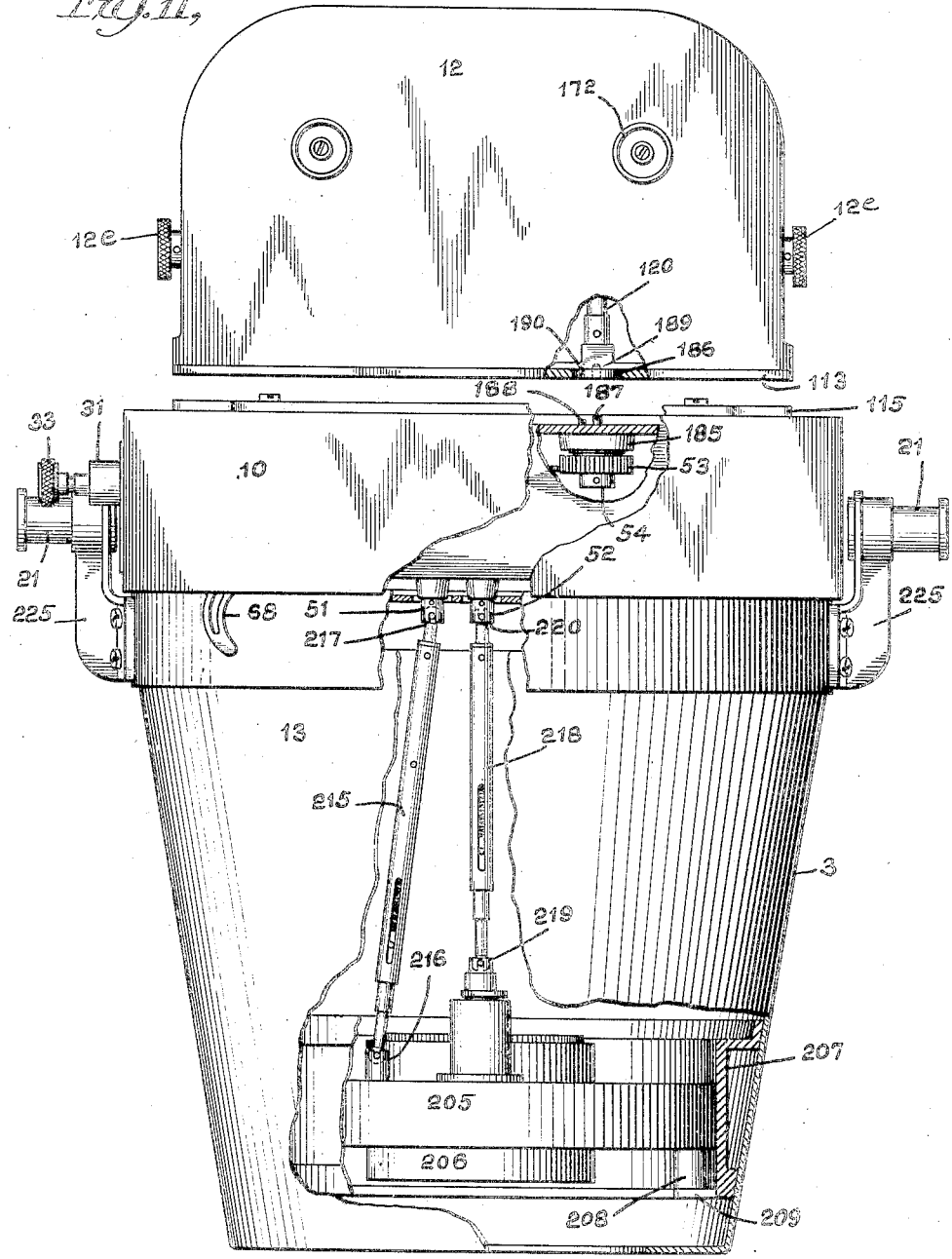
Fig. 11, Jan. 4, 1927. 1,612,860
S. M. FAIRCHILD
AERIAL CAMERA
Filed March 1, 1923 11 Sheets-Sheet 7
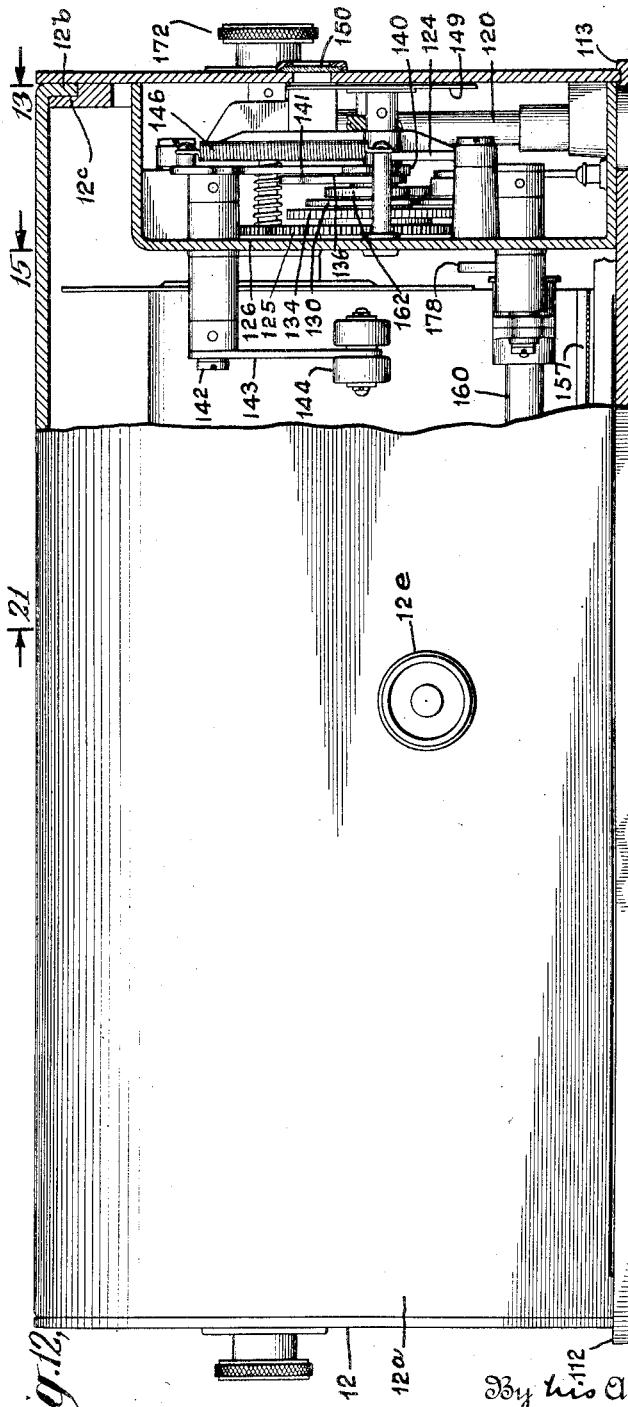
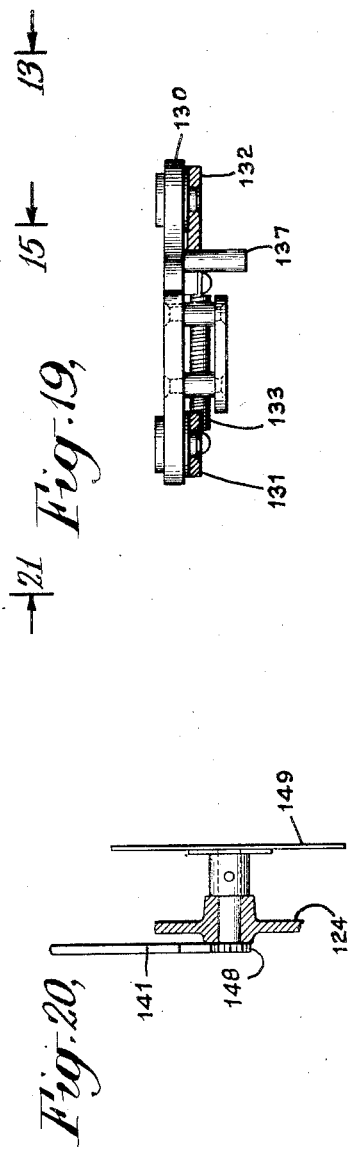
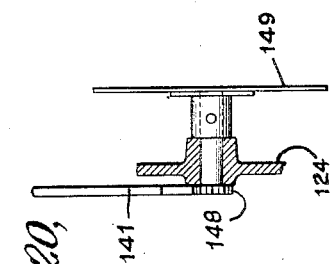

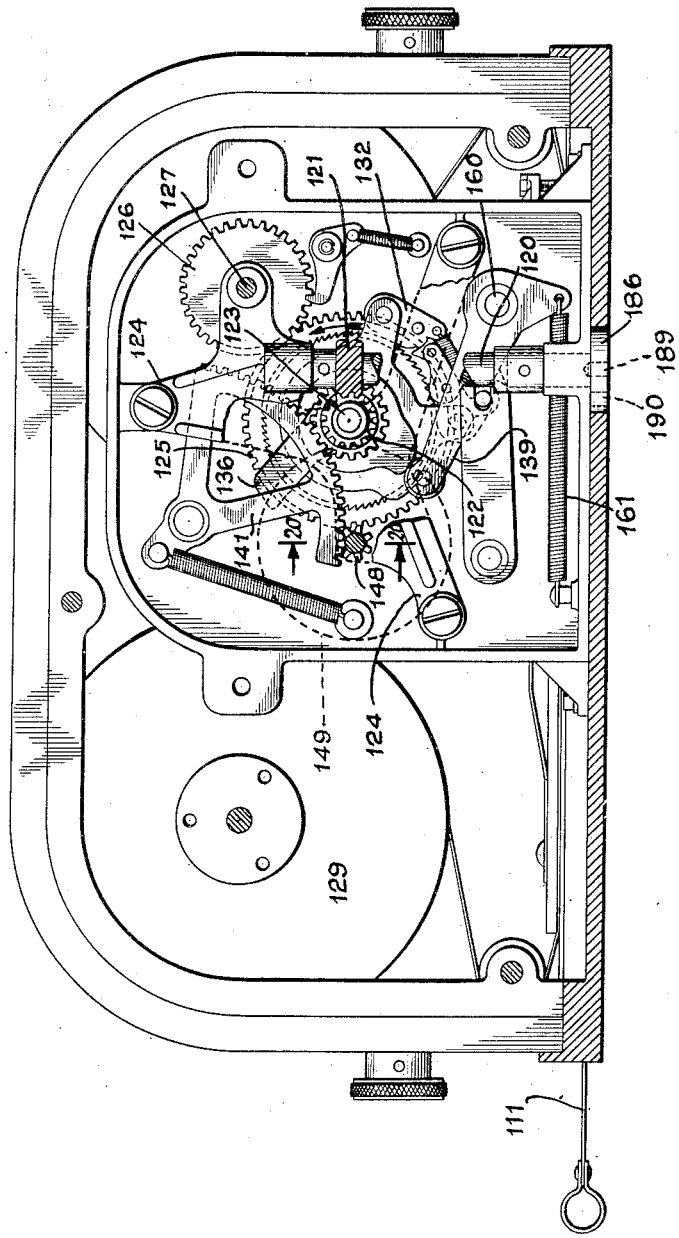

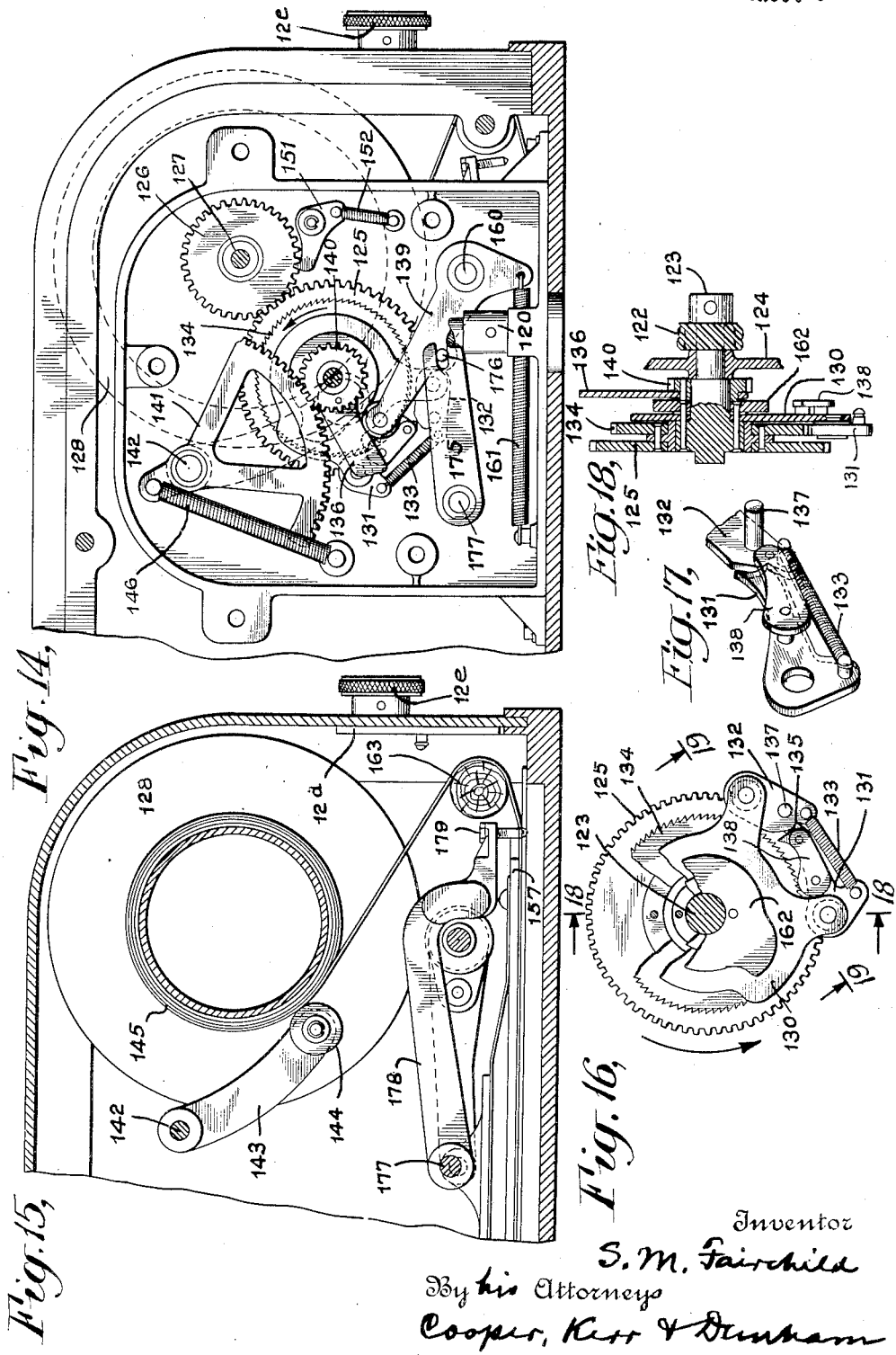

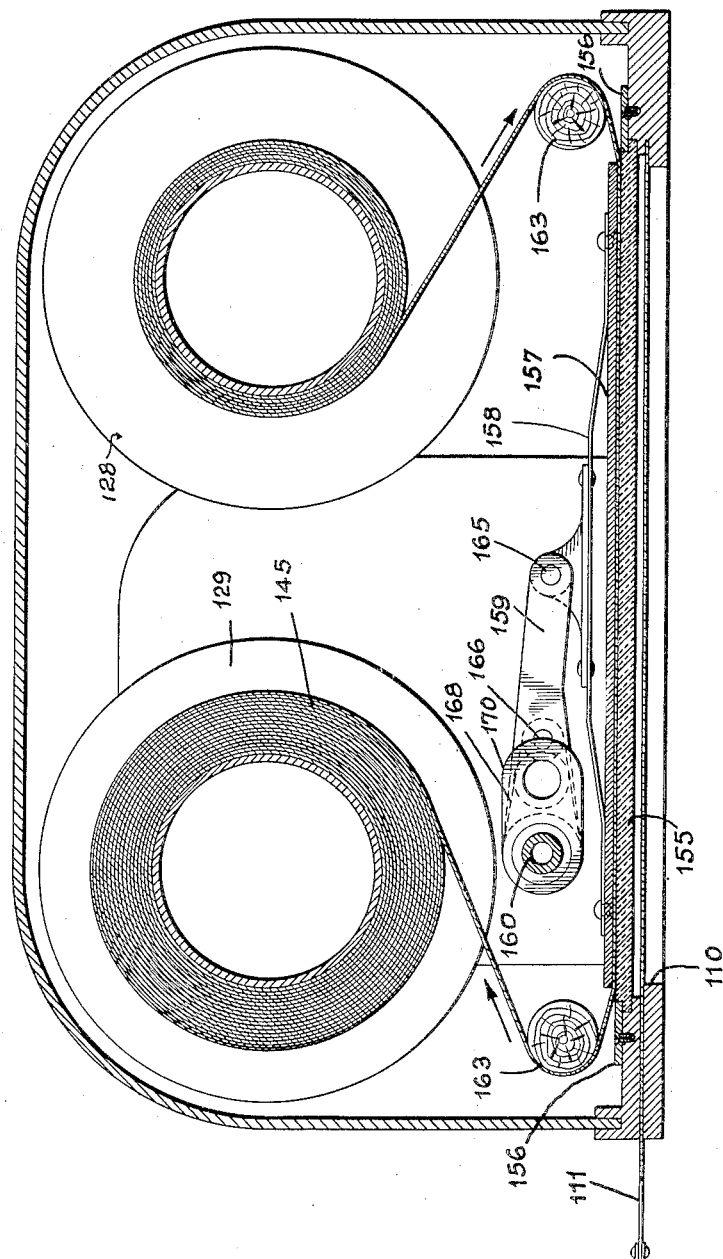

Jan. 4, 1927.  S. M. FAIRCHILD  1,612,860
AERIAL CAMERA
Filed March 1, 1923    11 Sheets-Sheet 11

S. M. Fairchild
Inventor

By his Attorneys
Cooper, Kerr & Dunham

Patented Jan. 4, 1927.

1,612,860

UNITED STATES PATENT OFFICE.

SHERMAN M. FAIRCHILD, OF NEW YORK, N. Y.

AERIAL CAMERA.

Application filed March 1, 1923. Serial No. 622,032.

This invention relates to aerial cameras, particularly of the type adapted to be operated by power, such as is used in military and mapping operations.

The chief object of my invention is to provide a camera of superior utility for producing work of the greatest accuracy under the varying and often difficult conditions met with in aerial photography.

To attain this result I make use of a combination of various features contributing to the complete usefulness of the camera through versatility, convenience of use, and through the use of devices eliminating or correcting errors of scale, distortion and focus. Since some of the devices for these purposes are not new I do not constitute the use of the devices part of my invention, but only means necessary for the adaptation of these devices to my camera.

In carrying out one part of my invention, I may provide means for conveniently using lenses of different focal lengths, permitting the use of the camera for obtaining considerable detail, even from a high altitude, or when desirable, for covering a wider field on the same area of sensitive surface. For the convenience in operating my camera, particularly in the confined space available in an aeroplane, I provide means for operating the camera by hand, or, when desirable, by power and under control from a distance, at will. Means may also be provided to rapidly substitute a new supply of sensitive material when needed, thus insuring continuous operation over long periods of time as is frequently necessary in making a series of overlapping photographs for subsequent assembly into a photographic map. To improve the utility of my camera and thereby improve the results obtained, through the elimination of distortion and errors of focus which might otherwise make photographs obtained unsuitable for precise measurements in cartography, I may provide the camera with a shutter at the lens, instead of the focal plane shutter generally used in aerial cameras, and with means for clamping the film, if film is used, firmly in the focal plane of the lens. Further improvements constituting my invention will become apparent in the following detailed description of one construction which I may use in carrying out the complete invention and in the claims.

In carrying out my invention as stated above, I construct my camera in separable and interchangeable units, each carrying its proper part of the mechanisms composing the whole and provided with separable connecting means for causing the component parts of the mechanism to operate harmoniously when the camera is assembled.

For convenience in use I provide means whereby the various operations of preparing the camera for exposure, making the exposure, and when necessary, of furnishing a new supply of sensitive material, may be performed at will without interference, or, when used with remote control, the preparing of the camera for exposure may be done automatically immediately after the exposure is made. This means, which for convenience is termed the driving mechanism, may include a source of mechanical power, as for example an electric motor, or it may merely control the application of mechanical or manual power and distribute the same to the several other mechanisms or devices in the camera for the harmonious operation thereof.

To eliminate the distortion and uneven exposure which often result from the use of focal plane shutter, I prefer to use a shutter at the lens, which may be of the construction described in my copending application Serial No. 565,075, or of any other construction convenient and suitable for the purpose.

Since the use of flexible film is desirable for its light weight and small bulk I provide a magazine therefor, carrying mechanism for positioning the film which may include a glass plate against which the film is pressed during exposure by a movable plate which is adapted to be readily released and removed for inspection and cleaning of the glass plate, and for other purposes which will occur to one skilled in the art. I may also provide a plurality of duplicate magazines which may be loaded in advance; so that when a roll of film, for example, has been exposed the magazine containing the same can be removed and one containing unexposed film can be substituted. This operation requires less time than would be needed to remove the used film from the magazine and insert a fresh roll. I do not limit myself, however, to the use of film as the same principles can also be applied to the use of interchangeable plate magazines, Fig. 1 is a elevational view of my camera, supported in a universal mounting of the gimbal type.

Fig. 2 is a similar view of the camera from the left of Fig. 1.

Figs. 3ᵃ, 3ᵇ, 3ᶜ and 3ᵈ are perspective views which, taken together, show my camera disassembled, with two interchangeable lens cones, one for a lens of longer focus than the other. Of these figures, Figs. 3ᵃ and 3ᵇ show the removable film magazine and the camera body, respectively, and Figs. 3ᶜ and 3ᵈ show the two lens cones mentioned.

Fig. 4 is a detail plan view of a portion of the camera body, showing the camera-driving mechanism, partly in horizontal section on line 4—4 of Fig. 5.

Fig. 5 is a detail cross section on line 5—5 of Fig. 4.

Fig. 6 is a detail sectional plan view on line 6—6 of Fig. 5.

Fig. 7 is a detail section on line 7—7 of Fig. 5, showing the position of certain parts immediately after release of the shutter.

Fig. 8 is a detail section on line 8—8 of Fig. 7, and Fig. 9 is a detail section on line 9—9 of Fig. 8.

Figure 22:
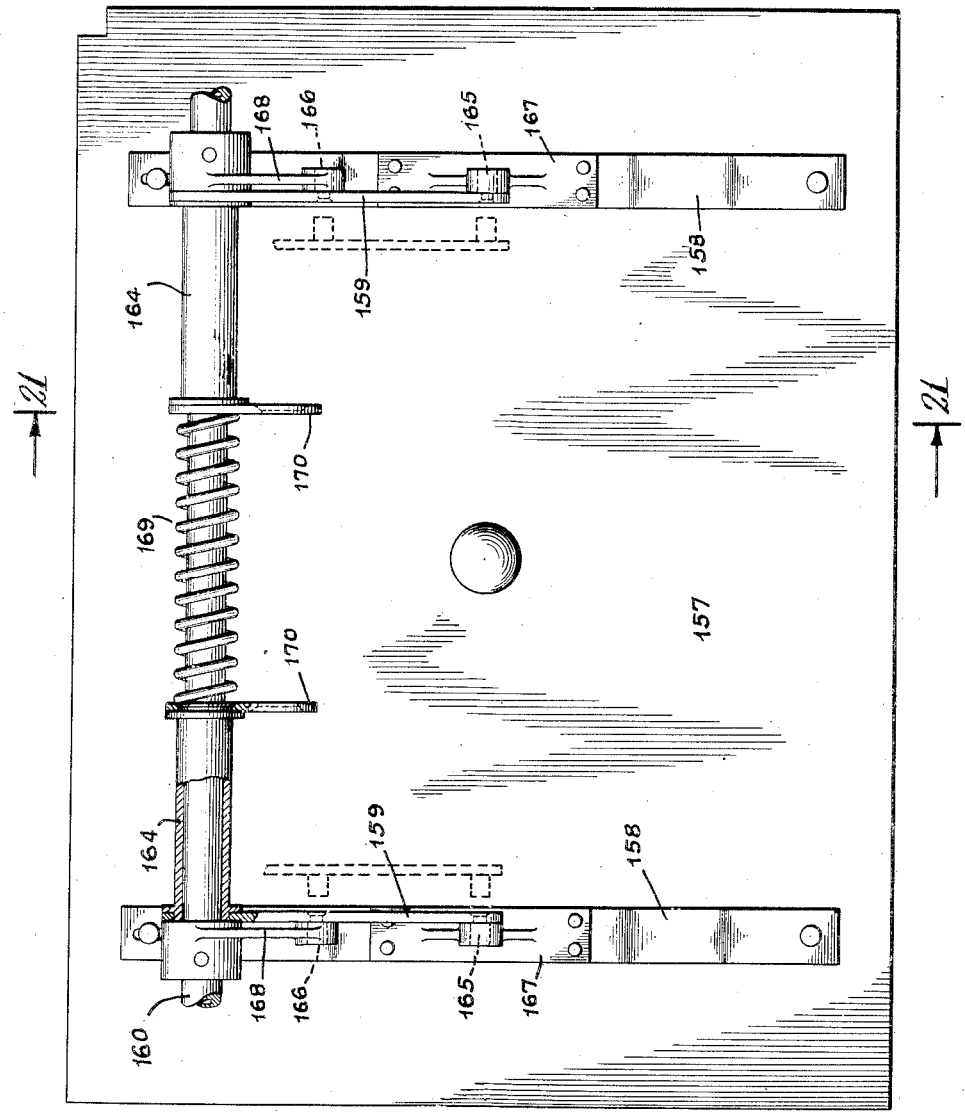

Fig. 10, on the same sheet as Fig. 6, is a diagram illustrating the electric circuits employed in the driving mechanism.

Fig. 11 is an elevational view of my camera removed from its mount, with portions of the body-casing and lens cone broken away to show enclosed parts, and with the magazine detached and raised slightly above the camera body.

Fig. 12 is a side view of the detachable magazine with part of its casing broken away to show portions of the film-spacing and film-positioning mechanism.

Fig. 13 is an end-sectional view of the magazine, on line 13—13 of Fig. 12.

Fig. 14 is a detail sectional view similar to Fig. 13, but showing the parts in a different operative position.

Fig. 15 is a detail sectional view on line 15—15 of Fig. 12.

Fig. 16 is a detail view, in elevation, with parts broken away, of certain elements shown in Figs. 13 and 14.

Fig. 17 is a detail perspective view of parts shown in Fig. 16.

Figs. 18 and 19 are detail sections on lines 18—18 and 19—19, respectively, of Fig. 16.

Fig. 20 is a side view of the film indicator.

Fig. 21 is a cross section of the magazine, on line 21—21 of Figs. 12 and 22.

Fig. 22 is a detail plan view of the film-positioning or pressure plate and its actuating mechanism.

In the construction shown, my camera comprises a camera-body 10, housing the driving mechanism and carrying the driving motor 11, which latter is rigidly mounted on the camera body; a magazine 12, housing the sensitive film or plates, as the case may be; and a lens cone 13, housing the lens and shutter. These three parts, the camera body, the magazine, and the lens cone, are separable from each other, and constitute what may for convenience be termed separable camera units. The preferred mounting, shown in Figs. 1 and 2, is fully described in my copending application Ser. No. 595,046, to which reference may be had for a detailed explanation. It is deemed sufficient here to say that the camera is pivoted (at diametrically opposite points) in brackets 14 on an inner gimbal ring or frame 15 which is itself pivoted (at the ends of a diameter at right angles to and in the plane of the axis of the camera pivots) in brackets 16 on a carrier ring 17 rotatably mounted on a support 18. The latter is suspended by means of arms 19 which can be mounted on the aeroplane in a convenient way, as by means of clamps 20 adapted to engage suitable parts of the aeroplane, not shown. The camera pivots, 21, Figs. 1, 2, 3ᶜ, 3ᵈ, and 11, are preferably carried by the removable lens cone, as described more fully hereinafter.

The removable magazine 12 carries the sensitive film or plates, as previously stated, and also houses the changing mechanism, that is the means by which the plate or film is carried out of the focal plane or exposure field after each exposure and by which a fresh plate or film is brought into the field for the next exposure. The driving mechanism, carried by the camera body 10, actuates the changing mechanism at appropriate times, and also actuates or controls the shutter which is carried by the detachable lens cone 13. For these purposes releasable connections are provided between the changing mechanism and the driving mechanism, and between the driving mechanism and the shutter, as more fully described hereinafter.

Referring now to Figs. 3ᵇ, 4, 5, 6, 7, 8 and 9, wherein the driving mechanism is illustrated in detail, 30 designates a driving shaft which may be rotated by means of a hand-crank 31; or by means of the electric motor 11, connected in any convenient manner, as by suitable gearing not shown, to a transmission shaft 32. The latter shaft has a worm 33 meshing with a worm gear 34 pinned or otherwise fixed on the hub of a clutch-member 35 which is rotatable but is axially stationary on the adjacent end of the driving shaft 30. The latter also has a sliding clutch member 36, having ratchet teeth to cooperate with the teeth on the first mentioned clutch member and urged into engagement therewith by a spring 37, to permit the shaft 30 to be driven in the direction of the arrow. At the other end of the shaft 30 is a similar sliding clutch member 38 urged by a spring 39 into engagement with a clutch member 40 pinned on the adjacent end of the aligned crank shaft 41. It will be observed that the ratchet teeth on the two clutches, 35—36, 38—40, are opposite in direction. Accordingly, if the motor is driving the shaft 30 the camming effect of the cooperating teeth of clutch 38—40 can slide member 38 back on the shaft against the pressure of spring 39. In other words, clutch 38—40 simply overruns. Similarly, if the motor is disabled and the shaft is being rotated by means of the hand crank, or if the shaft is being driven by the hand crank faster than the motor can rotate the clutch member 35, the clutch 35—36 likewise overruns. To keep the crank from swinging or revolving when not in use the stem of the handle 42 is shifted into a locking recess 43, Fig. 5, in the side of the casing 44. This handle is provided with two circumferential grooves, one of which is shown at 45, Figs. 4 and 6. In the other is seated a helical spring 46 held around the stem by an annular groove 47 in the end of the crank. When the stem is pressed into the recess 43 the spring is cammed into the groove 47 and snaps into the outer groove 45 when the stem is seated in the locking recess, thereby holding the handle yieldingly in the recess. To release the crank for use it is only necessary to pull the handle out until the spring snaps into the other groove in the stem.

The shutter 205, Fig. 11, is "set" by a rotatable shaft 51, Fig. 5, and is released, to make an exposure, by a rock-shaft 52. If the shutter is of the self-setting type, the rock shaft may perform both functions. The changing mechanism, by which the plate or film is changed in each cycle of operation, is actuated by the gear 53 and shaft 54 (Fig. 4) on which it is fixed.

For the purpose of rocking the shaft 52 to release or trip the shutter, the shaft is connected at its inner end with a latch plate 56 having a tooth 57 normally engaged by a pivoted dog 58 which holds the plate in its home or inoperative position shown in Fig. 6. The dog mentioned has a stud 59, Fig. 7, extending into a groove in the adjacent end of the core 60 of a solenoid 61, so that when the solenoid is energized and the core retracted the dog will be disengaged from the latch plate and thus permit the latter to be rocked counterclockwise by the spring 62, as in Fig. 7, until arrested by the stop 63. The movement thus imparted to the shaft 52, Fig. 5, releases the shutter.

The solenoid 61 is in circuit with a battery or other source of current 64, Fig. 10, which circuit also contains a pair of normally open spring contacts 65 located at any convenient point and adapted to be closed by means of a key 66. When the contacts are opened again by release of the key the circuit is of course broken, whereupon the leaf spring 67, Figs. 4 and 5, advances the solenoid core to its initial position, shown in the figures mentioned. The core may also be retracted manually by means of a sliding trigger 68, Fig. 5, connected to the rear end of the core by an arm 69.

Each release of the latch plate 56 (by which the shutter is tripped) is registered on a suitable counter 70, Fig. 6. For this purpose the counter is actuated by a sliding rod 71, urged leftwardly and normally held against the outer end of the latch plate by a spring 72, so that when the plate is swung by its spring 60 the rod will follow. On the return movement of the plate (effected as explained below) the rod is retracted and the spring 72 again compressed.

When the forked latch plate or yoke 56 swings counterclockwise (Fig. 6) to release the shutter the stud or stop 73 on the plate is carried into engagement with the spiral or snail cam 74, which, as hereafter explained, rotates in the direction of the arrow, thereby swinging the plate gradually back to its initial position and into engagement again with the dog 58. This means that the dog is cammed in the counterclockwise direction as the tooth 57, Fig. 6, passes over it, but such movement of the dog is permitted by the spring 67, Fig. 5, which serves to advance the solenoid core and hold the dog yieldingly in the path of the latch plate tooth 57. It will be observed that after the cam has swung the latch plate the latter is held positively in such position until the drop in the cam has passed the stud 73, as in Fig. 7. By that time, however, the changing mechanism and the shutter-setting mechanism have completed their operations. In other words, the operator may close the contacts 65, or pull the trigger 68, at any time he pleases, but the shutter cannot thereby be discharged until it has been set and the plate or film changed. Nor can the shutter spring be over-wound more than to the slight extent mentioned hereinafter. On the other hand, if he holds the latching dog in non-engaging position, by keeping the solenoid circuit closed or the trigger 68 retracted, the latch plate will trip the shutter every time the drop in the cam reaches the stud 73, thus causing an exposure to be made at each rotation of the cam. But even in that case the exposure can occur only after, and never before, the plate or film has been changed.

The gear 53, Fig. 4, is driven by a gear 75, Figs. 4 and 5, fixed on a transverse counter shaft 76, and the shaft 51, Fig. 5, is driven by a gear 77 meshing with a gear 78 fixed on the same shaft 76 to which cam 74 is also fixed. The shaft 76 is itself driven by the devices described below.

On the shaft 76, just mentioned, is a loose sleeve 79, Figs. 7 and 8, on which are fixed a driving ratchet 80, and a helical driving gear 81, the latter meshing with a similar gear 82, Fig. 4, on the driving shaft 30. It will therefore be seen that to rotate the shaft 76 the gears 75 and 78, thereby actuating the changing and setting mechanisms, the sleeve and shaft must be connected. For this purpose the following instrumentalities are provided:

On the cam 74, which is fixed on the shaft 76, is a pivoted driving pawl 85, Figs. 6, 7 and 8, and on the same pivot is a controlling dog 86. Springs 87 and 88 are provided to hold the pawl and dog normally in the relative positions shown in Fig. 6, in which the stud 89 on the pawl bears against the arm 90 of the dog. In this position the tail of the dog rests against a lug 91 on the extension 92 of the latch plate 56, which holds the pawl out of engagement with the driving ratchet 80. When, however, the latch plate is rocked counterclockwise to discharge the shutter as previously explained, the lug 91 is disengaged from the dog, whereupon the spring 88 rocks the dog and pawl assembly clockwise and brings the latter into engagement with the ratchet 80, as in Fig. 7. If then the latter is rotating or begins to rotate in the direction of the arrow, Fig. 7, the shaft 76 and the gears 77 and 78 are rotated therewith.

Revolving in the direction of the arrow, Fig. 7, the pawl 85 and the dog 86 approach their initial position just after the latch plate has been re-engaged by the locking pawl 58 as previously explained, so that the lug 91 is in the path of the tails of the pawl and dog. The tail of the dog therefore strikes the lug and is rocked counterclockwise thereby tensioning spring 87, until the tail of the pawl is also in contact with lug 91. The movement of the dog and pawl assembly being continued, the pawl is rocked out of engagement with the ratchet, and spring 87 rocks the pawl farther from the ratchet so that it cannot re-engage the latter upon the reverse movement of the cam 74 explained hereinafter. At this instant the drop on cam 74 is beyond the stud 73 on the latch plate, the recess 93 in the disk 94, Fig. 9, is beyond the stud 95 on arm 96, and the shutter driving spring (not shown) has been slightly over-wound. The latter spring therefore reverses the movement of the cam 74 and shaft 76 and turns them backward until the shoulder 93 in disk 94 comes against the stud 95 as in Fig. 6, thereby arresting the backwardly turning parts in the position shown in the figure just mentioned. In this position, as in Fig. 7 also, the tail of the pawl 85 is in rear of the tail of the dog 86 and hence is not bearing against lug 91. On the other hand, the stud 89 is held in engagement with arm 90 by spring 87, so that when the lug is again swung down, the dog, urged by spring 88, will positively carry the pawl into engagement with the ratchet. It will be seen that spring 88, under tension when the parts are in initial position, Fig. 6, and the slightly over-wound shutter-spring tends to rotate the cam 74 counterclockwise. This movement, however, is prevented by stud 95 in the recess 93 in disk 94, which is rigidly connected with the cam.

Inasmuch as the changing and shutter-setting mechanisms are entirely disconnected from the shafts 76 and 30 when said mechanisms have performed the functions for which they are designed, the motor which drives the two shafts may run continuously. It is preferred to stop the motor after the camera has been prepared for the exposure and start it again after the shutter has been released. For this purpose the motor circuit, Fig. 10, is provided with two pairs of normally open spring contacts 100, 101, in parallel with each other. The first pair is closed by an insulating stud 102, Fig. 4, on the latch plate 56, when the latter is swung counterclockwise after release by the dog 58. This closes the motor circuit and the motor therefore starts. As the cam disk 94 starts, the incline 103 therein (see Figs. 7 and 9) cams the arm 96 counterclockwise, causing the insulating finger 104 to close the contacts 101, thus laying a shunt across contacts 100, Fig. 10. When the latch plate is swung back to initial position by the cam 74 the last mentioned contacts open again; but the motor circuit is not broken thereby, since the cam 94 is still holding the contacts 101 closed, and continues to do so until the recess 93 in its edge reaches the stud 95. This occurs just after the changing and setting mechanisms have been fully operated. The motor then stops, both pairs of contacts being open, and does not start again until the shutter has been released for the next exposure.

The operation of the devices illustrated is described in detail in the foregoing, but may briefly summarized as follows:

Retraction of the solenoid core 60 (by closing the solenoid contacts 65, Fig. 10, or by pulling the trigger 68, Fig. 5) rocks the dog 58, Fig. 6, counterclockwise, thereby releasing the latch plate 56, which is at once swung in the same direction by its spring 60. This movement of the latch plate withdraws lug 91 from the tail of dog 86, allowing the driving pawl 85 to swing up into engagement with the driving ratchet 80, and causes stud 102 to close the motor contacts 100, thereby starting the motor 11 and connecting the shaft 76 and gears 77, 78, with the motor-driven gear 81, ratchet 80, and cams 74, 94. The mechanisms for changing the plate or film and setting the shutter are thus actuated. As the cam 74 revolves it gradually restores the latch plate 56 to initial position;

and shortly after cam 94 starts, it rocks arm 96 and thereby closes the contacts 101 so that when the contacts 100 are opened by the homeward movement of the latch plate the motor circuit will still be closed. As the revolving cam 74 approaches its initial position the tails of pawl 85 and dog 86 meet the lug 91 and are swung counterclockwise, disengaging the pawl from the ratchet. At the same time the contacts 101 open, swinging arm 96 into the recess 98 in cam disk 74. The shutter-spring, which has been slightly over-wound by the clockwise rotation of the gear 78, now reverses the movement of the gear and the associated cams 74, 94, thereby bringing the shoulder or recess 98 against the stud 95. All the parts are now in their initial positions, as in Fig. 6, with the plate or film changed, the shutter set, and the motor circuit open. If instead of releasing the key 66 or trigger 68 after the motor is tripped the operator keeps the key depressed or the trigger retracted thereby preventing engagement of the latch plate tooth 57 by the dog 58, the latch plate will, as soon as the drop on cam 74 passes the stud 78, which occurs shortly after the plate or film has been changed and the shutter reset, swing forward again under the influence of spring 62 and thus release the shutter, thereby making another exposure and again starting the driving mechanism. This operation will of course be repeated as long as the dog 58 is held in inoperative position.

The film magazine, Figs. 3ª and 11 to 21 inclusive, has a flat bottom provided with a rectangular exposure opening 110 (see Fig. 21) to register with the corresponding opening in the top of the camera body 10 (Fig. 3ᵇ). The exposure opening 110 may be closed by a dark slide 111. The magazine is detachably secured to the camera body by means of flanges 112, 113, the first to cooperate with a fixed overhanging clip 114 on the camera body, Fig. 3ᵇ, and the other to cooperate with a diagonally sliding clip 115 fastened on the camera body by means of screws 116 extending through inclined slots 117 in the clip, as will be readily understood.

The magazine cover, 12ª, is removable and is provided with end flanges, as 12ᵇ, Fig. 12, engaging flanged members 12ᶜ on the edges of the end walls to provide light-tight joints thereat. Any suitable locking means, as for example sliding latches indicated at 12ᵈ and actuated by external knobs 12ᵉ, Figs 14 and 15, may be provided to hold the cover in place but permit the same to be lifted off, when desired, for loading the magazine and for other purposes.

Motion from the driving mechanism in the camera body 10 is communicated (through a releasable connection hereinafter described) to the magazine driving shaft 120, Figs. 12 and 13, provided with a spiral gear 121 which meshes with a corresponding gear 122 on the transverse shaft 123, Figs. 16 and 18. The gear 122 is adjacent to the support 124, in which said shaft is mounted. See Figs. 12, 13 and 18. Loose on the inner end of shaft 123 is a large gear 125, Fig. 14, meshing with a gear 126 on the film spindle 127 which engages the film take-up spool 128 in the usual manner to rotate the latter and thus draw film from the supply spool 129. It will therefore be seen that the take-up spool will be rotated whenever the gear 125 is operatively connected with the rotating shaft 123. This connection is effected at appropriate times in the following manner.

Fixed on shaft 123, Figs. 13, 14, 16, 17, is a driving plate 130 carrying a pivoted pawl 131 and a pivoted latch 132 connected by a contractile spring 133 which tends to swing both these members toward the ratchet 134 loose on the shaft but fixed to the film-driving gear. This action, however, is prevented by the engagement of the pointed end of the pawl in the notch 135 of the latch, Fig. 16. Consequently the driving plate and the pawl and latch can revolve (with shaft 123) without actuating the ratchet; but when the latch, moving in the direction of the arrow, Figs. 13 and 16, reaches the inclined end of arm 136 (described hereinafter) the stud 137 on the latch (Fig. 17) is cammed outwardly, thereby swinging the latch in the same direction and consequently disengaging the latch from the pawl 131, as in Fig. 14. The pawl is then swung into engagement with the ratchet, which is thereby rotated in the direction of the arrow. This movement continues until the release-plate 138 (Fig. 17) on pawl 131 meets the roller on the end of arm 139 (described hereinafter), which throws the pawl out of engagement with the ratchet and carries its pointed end again into the locking notch 135, Fig. 16. The film-feed ceases at once, but of course the driving plate 130 (carrying the driving pawl) continues to revolve until the shaft 123 is itself arrested.

The arm 139, which, as described above, disengages the driving pawl 131 from the driving ratchet 134, is itself pivoted, but is always in the same position when it performs the function stated, and hence the film-feeding operation always ceases at the same point in the cycle; and inasmuch as the film-feed begins when the latch 132 engages the arm 136, it will be evident that the extent of the rotation imparted to the gears 125 and 126, and hence the amount of film drawn off the supply spool, will depend upon the position of the arm 136. Accordingly the position of the latter is determined by the diameter of the roll of film on the take-up spool, in such manner that the variable extent of rotation imparted to the take-up spool will always be sufficient to draw the same length of film from the supply spool. For this purpose the said arm 136, (Figs. 13 and 18) is mounted loosely on shaft 128 but is connected rigidly to a gear 140 meshing with a sector 141 fixed on a rock shaft 142 on which is fixed, at its other end, an arm 143 (Figs. 12, 14 and 15) carrying a roller 144 held against the roll of film 145 on the take-up spool by a spring 146. Evidently, if the take-up spool is empty the film-measuring sector 141 is swung to its extreme rightward position (Fig. 13) thereby positioning the measuring arm 136 also in the extreme rightward position, with the result that the driving pawl 131 will pick up the ratchet 134 at a point relatively remote from the point at which the two are disengaged, and accordingly the take-up spool will be given its maximum rotation. As the spool fills, the arm 143 is swung back and the arm 136 is retracted, thus causing the pawl to pick up the ratchet later and later and hence give the spool correspondingly less movement; but inasmuch as the lessened movement of the spool is always proportional to the increased diameter of the roll of film on the spool, the amount or length of film wound onto the spool at each movement thereof is substantially constant.

As will be seen from the above, the position of the sector 141, Fig. 13, depends upon the number of unit-lengths of film on the take-up spool. Advantage is taken of this fact to indicate the number of such lengths that have been wound on the spool. For this purpose a pinion 148 is provided (Fig. 13), to mesh with the sector and carrying a dial 149, Figs. 12 and 20, which may bear suitable numbers or other characters visible through a window 150 in the end of the magazine casing.

Backward rotation of the take-up film-spool, with consequent looseness of the film and in some cases incorrect spacing thereof, is prevented by a holding pawl 151, Fig. 14, held in engagement with gear 126 of a spring 152.

To position the film accurately in the focal plane or exposure field, there is provided in the exposure opening 110 of the magazine (Fig. 21) a glass position-plate 155 (removably held by the strips 156) upon which the film is firmly pressed by the yielding pressure of a plate 157 carried by the springs 158 which are in turn carried by the arms 159, Figs. 21 and 22. The arms mentioned are mounted on a rockshaft 160, to one end of which the arm 139, Fig. 14, is fixed. This arm is urged clockwise by a spring 161, which holds the roller (carried by the free end of the arm) against the cam 162 (shown also in Fig. 16) fixed on shaft 123 and so positioned thereon that the rise on the cam will engage and rock the arm downwardly (as in Fig. 13) at the proper instant after the film-feed is stopped by the arm. This movement of the arm rocks shaft 160, which swings the arms 159 down (Figs. 22 and 21) thereby pressing the plate 157 down upon the film and holding the latter firmly against the upper surface of the glass position-plate 155. The timing of the cam 162 is such that pressure occurs before the exposure, continues during the exposure, and is relieved (by the rise on the cam passing the pressure arm) before the succeeding feeding movement of the film begins. When the rise on the cam passes the pressure arm the spring 161 swings the latter up and thus raises the pressure plate. Preferably the parts involved are so proportioned that this upward movement of the plate is sufficient to bring it well above the lower edges of the film guide-roller 163, Fig. 21, so that when the film is in motion (during the feeding operation) it will be out of contact with both plates 155 and 157 and hence will not be scratched thereby.

It will be observed that although the pressure plate 157 is positively actuated the pressure exerted by the arms 159 is communicated to the plate by the springs 158, which are independent of each other, so that if the actuating arms mentioned happen not to be in accurate alignment on the shaft 160 and hence do not approach the position-plate 155 when the shaft is rocked the pressure plate can adjust itself and press the film snugly on the position-plate without danger of exerting materially greater pressure on one part of the latter than on another. Breakage of the position-plate is thus virtually eliminated.

The arms 159, Fig. 22, which carry the pressure plate 157 are not fixed on the actuating shaft 160, but are mounted on sliding sleeves 164 and are provided with studs 165, 166 engaging corresponding apertures in the spring yokes 167 and arms 168, the latter being pinned on the shaft. The sleeves 164 are urged outwardly on the shaft by a coil spring 169, which serves to hold the studs mentioned in their respective apertures, whereby rocking of the shaft will raise and lower the pressure plate as previously described. The sleeves are provided at their inner ends with finger pieces 170. When these are grasped and pressed toward each other the sleeves are shifted toward each other, bring the arms 159 to the positions shown in dotted lines, wherein the studs 165, 166 are disengaged from the yokes 167 and arms 168. The pressure plate 157 can now be removed for cleaning and for access to the upper surface of the position plate 155 for cleaning or replacement.

As so far described, the feeding of the film is effected automatically by the shaft 120 (Fig. 13) which is rotated by the shaft 54 (Fig. 4) when (upon closing of the motor circuit at contacts 65, Fig. 10) the main driving shaft 30 is rotated. The film may, however, be advanced manually by grasping and turning the knob 172 (Fig. 12) which is fixed on the end of the film spindle 127 (Fig. 14) outside of the magazine casing, the operator noting the amount of film wound onto the take-up spool by observing the dial 149 through the window 150. This manual film-feed is permitted, without interfering with the automatic feed, by the fact that the gear 125 is loose on shaft 123 and that ratchet 134 is normally disengaged from pawl 131.

The magazine also carries means for marking the film at points adjacent to the exposed area, so that the film may be cut up safely for development if desired. For this purpose the swinging arm 175, Fig. 14, is provided, having in its free end a recess to engage an actuating stud 176 on the arm 139, which, it will be remembered, actuates the pressure plate 157. On the other end of the stud 177, on which the member 175 is fixed, is an arm 178, Fig. 15, carrying a punch 179 between the adjacent guide roller 168 and the edge of the pressure plate. It will therefore be seen that whenever the pressure plate is depressed the punch will also be actuated to mark the film, as by perforating or indenting it, outside of the exposure area or field.

In order that the film-changing mechanism in the magazine 12 and the driving mechanism in the camera body 10 may operate in harmony, so that the cycles of the two will have the proper time relation, the detachable or releasable operating connection between the mechanisms is constructed to permit engagement only at the proper relation. For this purpose the two shafts 54, 120, Figs. 11, 5 and 13, are provided with clutch disks 185, 186, respectively, the latter having a centering pin 187 and a driving pin 188 to enter a centering aperture 189 and driving aperture 190 in the other. The driving stud and driving aperture being properly located to give the correct timing in their respective mechanisms it will be seen that the two mechanisms are synchronized; in other words, they cannot be operatively connected except in the proper time relation. Inasmuch as the magazine can be loaded without interference with the feeding mechanism, the clutch disk 186 will, ordinarily, be found to be in position to engage at will with the other disk when the magazine is replaced on the camera body. If not, the magazine clutch disk can be turned by means of a suitable spanner or other tool, not shown, to bring it in position to match with the other disk, or the latter can be turned to match the first by sufficient movement of the hand crank 31. Or the driving stud may be constructed to yield downwardly if, when the magazine is placed on the camera body, the driving aperture in the magazine clutch disk does not match with the stud. Then when the driving mechanism is actuated, by the motor or the hand crank, the revolving stud will eventually find the aperture, whereupon it will snap up into the same. The two mechanisms are thus synchronized as before.

The third part of my three-part camera is the lens-carrying portion, which, being preferably conical in form, is herein termed the lens "cone". This part, marked 13 in the drawings, is removably attached to the underside of the camera body 10 in any convenient manner, as by means of machine studs 200, Figs. 3° and 3ᵈ, adapted to extend through holes, as 201, in the edge of the light opening in the camera body. Nuts, not shown, are used on the studs to bind the camera body and lens cone firmly together, as will be readily understood. The shutter 205, Fig. 11, in which the lens 206 is mounted, is seated in a carrier 207 suitably fixed in the lower end of the cone at approximately the position at which the lens is in focus for a distant object. The lens is accurately positioned by spacing stops, as 208, which bear on lugs 209 and upon which the shutter is held by screws (not shown) extending through said lugs.

The shutter 205, Fig. 11, is released or "tripped", to make the exposure, by the rockshaft 51, the motion of which is transmitted to the shutter by a shaft 215. The latter is preferably of the telescoping type and is releasably connected to the shutter and rockshaft by universal joints of the pin-and-slot type, indicated at 216, 217. This construction permits the shutter-release mechanism to be readily connected with the driving mechanism, by the operator removing the magazine and reaching down through the camera body. Similarly, the shutter-setting shaft 52 is connected to the shutter by a telescoping shaft 218 and releasable universal joints 219, 220.

To permit convenient use of lenses of different focal lengths without the complication incident to the provision of focusing means, I provide for my camera a plurality of interchangeable lens cones of different lengths appropriate to the different lenses, and mount the lenses in preferably fixed positions in the respective cones at such points therein that when it is desired to employ, in the camera, a lens of longer or shorter focal length it is only necessary to select the desired lens from among those provided and attach its cone to the camera body. The selected lens will then be found to be in accurate focus without the necessity of adjusting it. Two lens cones, of different lengths, for correspondingly different lenses, are shown at 13 and 13ᵃ in Figs. 3ᵈ and 3ᵉ, respectively, both adapted to fit the same camera body, 10, Fig. 3ᵇ.

In an aerial camera carried by a universal mounting, especially one of the gimbal type, it is usually desirable to have the center of gravity constant in position with respect to the axes of the mounting, in most cases in or near the plane of one or another of said axes or in or near the plane of both if they are in the same plane. But if the camera is designed for a certain position of its center of gravity with a given lens, the substitution of a lens of longer or shorter focal length will shift the center of gravity of the whole correspondingly, a result which in some instances might necessitate the removal or addition of weights or other adjustment. Accordingly I may construct my interchangeable lens cones so that the substitution of one for another will not seriously affect the position of the center of gravity, if at all, even when the several cones (and lenses) differ greatly. For this purpose the camera pivots, as 21, Figs. 1, 3ᶜ, 3ᵈ and 11, are mounted not on the camera body but on the lens cone, each cone having its own pivots, so located that when the cone is attached to the camera the center of gravity of the whole will be in substantially the desired position. Thus in Figs. 3ᵈ and 11, the pivot brackets 225 on the relatively short lens cone 13, carrying a lens of corresponding focal length, are extended upwardly far enough to lower the camera to a position at which the center of gravity will be, say, in the plane of the pivots. On the other hand, on the longer cone 13ᵃ, Fig. 3ᶜ, carrying a lens of longer focal length, the pivot brackets 225ᵃ are extended downwardly so as to raise the camera far enough to bring the center of gravity to about the same position as when the cone 13 was used.

Thus by providing different lens cones for different lenses, and mounting the camera pivots in suitable positions on the cones instead of on the camera body, the substitution of one lens for another can be made with the greatest ease and convenience.

The speed of the shutter can be varied by turning the knob 230 on the side of the camera body 10, Fig. 1, having a pointer traversing a scale 231. This knob rotates a shaft 232, Fig. 3ᵇ, on which, inside of the camera body is a cam 233 to actuate a bell crank lever 234 which in turn bears upon and actuates a vertical rod 235, Figs. 3ᶜ and 3ᵈ, extending through the lens cone into operative connection with the shutter.

For convenience in connecting the camera with the source of current 64, Fig. 10, and with the controlling contacts 65, these parts are provided with pin terminals 240, 241, respectively, which can be inserted into and removed from the corresponding sockets 242, 243, in the side of the camera body 10, Fig. 2. These sockets are connected to the appropriate parts of the driving mechanism as indicated in Fig. 10.

The gimbal mounting illustrated in Figs. 1 and 2 is claimed in my copending application Serial No. 595,046, and the driving mechanism, shown in Figs. 4 to 10 inclusive, is claimed in my copending application Serial No. 595,047. I may also use, in the camera described herein, the film-spool spindle described and claimed in my copending application Serial No. 595,048, the shutter described and claimed in my copending application Serial No. 565,075, the reference pattern-plate described and claimed in my copending application Serial No. 484,872, and the film-feeding and spacing mechanism described and claimed in my copending application Serial No. 330,066.

It is to be understood that the invention is not limited to the details of construction herein specifically illustrated and described and can be embodied in other forms without departure from its spirit as defined by the appended claims.

I claim:

1. An aerial camera comprising a plurality of separable units, one a camera body, another a magazine mounted on the camera body and having changing mechanism, and another a lens carrier attached to the camera body and having shutter mechanism; driving mechanism carried by one of said units; and releasable connections between the driving mechanism and at least one of the other named mechanisms to cause the same to operate in harmony.

2. An aerial camera comprising a plurality of separable units, one a camera body, another a magazine mounted on the camera body and having changing mechanism, and another a lens carrier attached to the camera body and having shutter mechanism; interlocking mechanism for the harmonious operation of the shutter mechanism and changing mechanism carried by one of said units; and releasable driving connections between the interlocking mechanism and at least one of the other named mechanisms.

3. An aerial camera comprising a plurality of separable units, one a camera body, another a magazine mounted on the camera body and having changing mechanism; a lens and a shutter associated with the camera body, driving mechanism carried by the camera body, and a releasable connection between the driving mechanism and the changing mechanism to cause said mechanisms to operate in harmony.

4. An aerial camera comprising a camera body, driving mechanism carried thereby, a magazine removably mounted on the camera body, changing mechanism carried by the magazine, a lens cone releasably attached to the camera body, shutter mechanism carried by the lens cone, and releasable operating connections between the several mechanisms to actuate the changing mechanism and the shutter mechanism in harmony with each other and with the driving mechanism.

5. An aerial camera composed of separable parts comprising a camera body, driving mechanism carried thereby, a driving motor carried by the camera body, a magazine removably mounted on the camera body, changing mechanism carried by the magazine, a releasable driving connection between said mechanisms to actuate the changing mechanism in harmony with the driving mechanism, a lens cone detachably connected with the camera body, shutter mechanism carried by the lens cone, and a releasable connection between the driving mechanism and the shutter mechanism to cause the latter to operate in harmony with the other mechanisms 6. An aerial camera composed of separable parts comprising a camera body, a magazine, and a lens cone; driving, changing, and shutter mechanisms carried separately by appropriate parts of the camera and connected together for harmonious operation; and a driving motor mounted directly upon one of said parts.

7. An aerial camera composed of separable parts comprising a camera body, a magazine, and a lens carrier; driving, changing and shutter mechanisms carried separately by appropriate parts of the camera and releasable driving connections between the several mechanisms.

8. In an aerial camera, a camera body, driving mechanism and a driving motor therefor carried by the camera body, a magazine removably mounted on the camera body, and changing mechanism carried by the magazine and releasably connected with the driving mechanism for actuation thereby.

9. In an aerial camera, a camera body, driving mechanism carried thereby, a magazine removably mounted on the camera body, changing mechanism carried by the magazine, and a synchronizing driving connection between said mechanisms, composed of separable parts carried by the camera body and the magazine.

10. In an aerial camera, a camera body, driving mechanism carried thereby, a film magazine removably mounted on the camera body, film-changing mechanism carried by the magazine, film-positioning mechanism carried by the magazine, actuating means, common to the film-changing and film-positioning mechanisms, and a releasable driving connection between the driving mechanism and said actuating means.

11. In an aerial camera, a camera body, a removable film magazine, film changing mechanism carried by the magazine, film-positioning mechanism carried by the magazine, driving mechanism carried by the camera, and a releasable driving connection between the driving mechanism and the mechanisms carried by the magazine.

12. In an aerial camera, a camera body carrying a driving mechanism, a removable film magazine carrying film actuating mechanism, and a releasable driving connection between the driving mechanism and the film actuating mechanism.

13. In an aerial camera, a camera body, a removable film magazine, film changing mechanism carried by the magazine, film positioning mechanism carried by the magazine, driving mechanism carried by the camera and a releasable synchronizing driving connection between the driving mechanism and the mechanism carried by the magazine.

14. An aerial camera comprising a plurality of separable units, one a camera body, another a magazine mounted on the camera body and having changing mechanism, and another a lens-carrier attached to the camera body and having shutter mechanism; means carried by the lens-carrier for pivotally supporting the camera; driving mechanism carried by one of said units; and releasable connections between the driving mechanism and the other named mechanisms to cause the same to operate in harmony.

15. An aerial camera comprising a plurality of separable units, one a camera body, another a magazine mounted on the camera body and having changing mechanism, and another a lens-carrier attached to the camera body and having shutter mechanism; interlocking mechanism for the harmonious operation of the shutter mechanism and changing mechanism carried by one of said units; releasable driving connections between the interlocking mechanism and at least one of the other named mechanisms; and motor means and manual means carried by the camera body operable independently of each other at will to actuate said mechanisms.

In testimony whereof I hereto affix my signature.

SHERMAN M. FAIRCHILD.